Patented Oct. 14, 1941

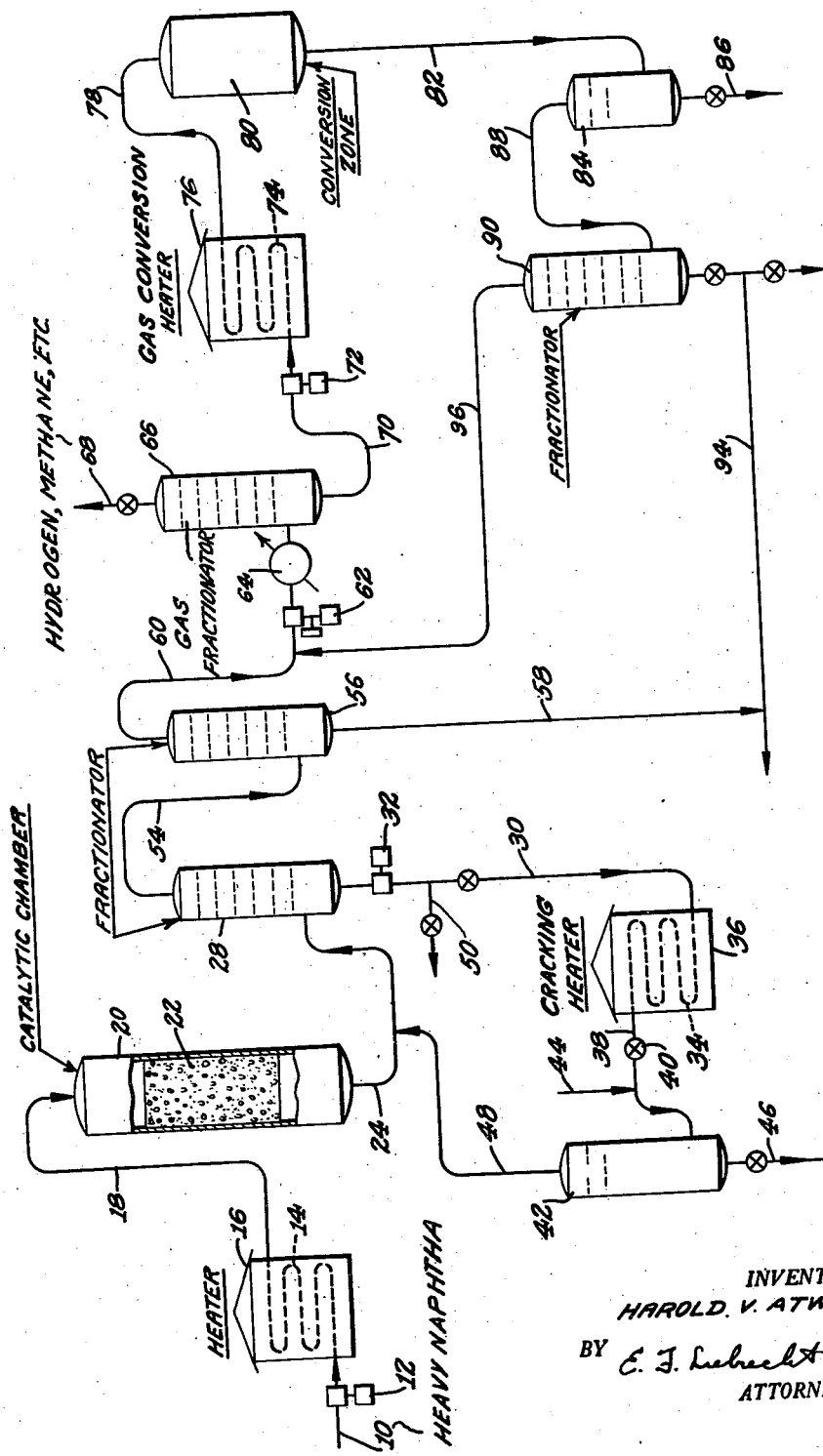
INVENTOR.
HAROLD. V. ATWELL
BY E. J. Leebrecht
ATTORNEY

2,258,726

UNITED STATES PATENT OFFICE 2,258,726

TREATING HYDROCARBON FLUIDS

Harold V. Atwell, White Plains, N. Y., assignor to Process Management Company, Incorporated, New York, N. Y., a corporation of Delaware Application July 29, 1938, Serial No. 221,884

1 Claim. (Cl. 260—668)

This invention relates to a process for treating hydrocarbon fluids.

According to this invention a heavy naphtha fraction consisting predominantly of $C_6$ or higher hydrocarbons is heated and vaporized and the vapors passed through a chamber containing a catalyst wherein they are maintained under suitable conditions to convert the hydrocarbons to aromatic hydrocarbons. The treated vapors are then fractionated to separate hydrocarbons higher boiling than gasoline from lighter vapors. The higher boiling hydrocarbons contain aromatic compounds having side chains and they are further heated under suitable pressure and temperature conditions to split off the side chains of the aromatic compounds and convert the higher boiling constituents into lower boiling hydrocarbons containing aromatic hydrocarbons.

The converted products are passed to a separator or evaporator to separate liquid residue from vapors and the vapors are preferably combined with the vapors leaving the catalytic zone above described to be fractionated or they may be separately fractionated to separate desired fractions. The vapors separated from the reaction products leaving the catalytic zone together with vapors separated from the conversion products as above described are further fractionated to separate relatively light hydrocarbons within the gasoline boiling range from lighter hydrocarbon vapors. The relatively light hydrocarbons within the gasoline boiling range contain aromatic compounds and are separated as a product suitable for use as a motor fuel having a high anti-knock value.

The vapors separated in the last fractionation contain hydrogen and normally gaseous hydrocarbons and they are treated to separate hydrogen and methane and, if desired, ethane from $C_3$ and $C_4$ hydrocarbons. The separated $C_3$ and $C_4$ hydrocarbons and, if desired, $C_2$ hydrocarbons are heated and maintained under suitable conditions to polymerize the normally gaseous hydrocarbons into higher boiling hydrocarbons. The polymerized products are passed to a separator to separate liquid residue from vapors and the vapors are fractionated to separate polymers within the gasoline boiling range from lighter vapors. The polymer gasoline has a high anti-knock value and may be separately collected as a product or it may be blendned with the aromatic hydrocarbons separated as a motor fuel as above described. The light vapors separated from the polymer gasoline may be further treat-ed to separate $C_3$ and $C_4$ hydrocarbons and recycled through the polymerization zone.

In the drawing, the figure represents a diagrammatic illustration of one form of apparatus adapted for practicing the process of my invention.

Referring now to the drawing, the reference character 10 designates a line through which a heavy naphtha fraction is conducted. The heavy naphtha fraction preferably contains paraffin hydrocarbons having 6 or more carbon atoms per molecule. The heavy naphtha fraction is passed through line 10 by pump 12 and through the heating zone 14 in heater 16. During its passage through the heating zone 14 the heavy naphtha fraction is heated to about 800 to 1000° F. The resulting vapors are passed through line 18 into the upper portion of a catalyst chamber 20 containing a catalyst 22. The vapors are passed through the catalyst chamber 20 in contact with the catalyst 22 and are maintained under a pressure of about atmospheric to 100 pounds per square inch. If the catalytic dehydrogenation is carried out in catalytic zone 20 at a relatively high temperature, some olefin gas will be produced along with the aromatic liquid.

The catalyst which I prefer to use in the catalyst chamber 20 contains chromic oxide which may be prepared by treating a soluble chromium compound to obtain a precipitate in gelatinous form. The vapors of the heavy naphtha fraction in passing through the catalyst chamber 20 are dehydrogenated and cyclization occurs to form aromatic compounds. During this treatment aromatic and alkylated aromatic compounds are formed, some of which fall within the gasoline boiling range and others have a boiling point higher than that of gasoline.

The treated vapors leave the catalyst chamber 20 through line 24 and are passed to a fractionating tower 28 wherein they are fractionated to separate hydrocarbons having a boiling point higher than gasoline from lighter vapors. The heavier or higher boiling hydrocarbons are withdrawn from the bottom of the fractionating tower 28 and passed through line 30 by pump 32 and then through a second heating zone 34 in heater 36. During their passage through the heating zone 34 the higher boiling alkylated aromatic compounds are heated under pressure to split off side chains to convert the higher boiling aromatic compounds into lower boiling aromatic compounds having a high anti-knock value and suitable for use as motor fuel. During this conversion in heating zone 34, considerable amounts of olefinic gas are produced which is polymerized to produce polymer gasoline as will be hereinafter described. The higher boiling hydrocarbons passing through the heating zone 34 are maintained under a pressure of about 200 to 1000 pounds per square inch, preferably about 750 pounds per square inch and raised to a temperature of about 850 to 1100° F., preferably about 975° F. If desired, a soaking section may be used with the heating zone 34.

The converted products leave the heating zone 34 through line 38 having a pressure reducing valve 40 and pass into the separating zone or evaporator 42 to separate liquid residue from vapors. A quench oil may be introduced through line 44, if desired. The liquid residue is withdrawn from the bottom of the separator or evaporator through line 46.

The vapors leave the top of the separator or evaporator 42 through line 48 and are preferably mixed with the treated vapors leaving the bottom of the catalyst chamber 20 through line 24 and then passed to the fractionating tower 28. However, the vapors from evaporator 42 may be passed directly to the fractionating zone 28 or may be passed to a separate fractionating zone to separate condensate oil from a relatively light hydrocarbon fraction within the gasoline boiling range and the condensate oil may be recycled through the heating zone 34 for further conversion. A portion of the higher boiling hydrocarbons withdrawn from the bottom of fractionating tower 28 and passing through line 30 is preferably withdrawn from the system through line 50.

The lighter vapors separated from the vapors introduced into the fractionating tower 28 pass overhead through line 54 and are passed to a second fractionating zone or tower 56 to separate relatively light normally liquid hydrocarbons within the gasoline boiling range from lighter vapors containing normally gaseous hydrocarbons. The normally liquid hydrocarbons within the gasoline boiling range are withdrawn from the bottom of the fractionating tower 56 and passed through line 58 and collected as a product. The hydrocarbon product withdrawn through line 58 contains aromatic compounds and is suitable as an anti-knock motor fuel or blending stock.

The vapors remaining after the fractionation in fractionating tower 56 pass overhead through line 60 and are further treated to separate normally gaseous hydrocarbons from hydrogen and methane and, if desired, $C_2$ hydrocarbons. One method of separating the normally gaseous hydrocarbons containing $C_3$ and $C_4$ hydrocarbons and, if desired, $C_2$ hydrocarbons, is to compress the vapors passing through line 60 by passing them through a compressor 62, then cooling the compressed charge by passing it through cooler 64 to condense certain of the hydrocarbons in the compressed normally gaseous hydrocarbons and then passing the cooled and condensed charge to a fractionating zone or tower 66 to separate the liquefied normally gaseous hydrocarbons containing $C_3$ and $C_4$ hydrocarbons from hydrogen and methane and, if desired, $C_2$ hydrocarbons. The gases containing hydrogen and methane are withdrawn through line 68.

The liquefied normally gaseous hydrocarbons are withdrawn from the bottom of the fractionating tower 66 and passed through line 70 by pump 72 through a third heating zone 74 in heater 76. During their passage through the heating zone 74 the normally gaseous hydrocarbons are maintained under such conditions of temperature and pressure to effect the desired polymerization and to produce higher boiling hydrocarbons suitable for use as motor fuel. During polymerization some alkylation also takes place to form hydrocarbons higher boiling than the normally gaseous hydrocarbon charge. In their passage through the heating zone 74 the normally gaseous hydrocarbons may be heated to a temperature of about 750 to 1300° F. while under a pressure of about 400 to 3000 pounds per square inch to effect the desired conversion into normally liquid hydrocarbons. Instead of using a thermal conversion a catalytic conversion may be used. Further, the polymerization may be carried out at higher temperatures, such as 1200–1750° F. and at lower pressures, such as atmospheric to 200 pounds per square inch to produce liquids containing aromatic constituents.

The polymerized products leave the heating zone 74 through line 78 and may be passed through soaking zone 80 to complete the conversion thereof. However, the soaking zone may be omitted and the complete conversion and polymerization effected during the passage of the normally gaseous hydrocarbons through the heating zone 74. The polymerized products leave the conversion zone through line 82 and are passed to a separating zone 84 to separate liquid residue from vapors, the liquid residue being withdrawn from the bottom portion of the separator 84 through line 86. If desired, a portion of the polymerized products leaving the third heating zone 74 may be admixed with the reaction products withdrawn from catalytic chamber 20 and passing through 24 to raise the temperature of the reaction products and effect conversion of higher boiling hydrocarbons to lower boiling hydrocarbons.

The separated vapors leave the top of the separating zone 84 and are passed through line 88 to a fractionating zone or tower 90 to separate normally liquid hydrocarbons within the gasoline boiling range from lighter vapors. The normally liquid hydrocarbons containing polymers are withdrawn from the bottom of the fractionating tower 90 through line 94 and may be withdrawn as a separate product having a high antiknock value, or they may be blended with the aromatic products withdrawn from the bottom of fractionating tower 56 and passing through line 58. The vapors leaving the top of the fractionator 90 are passed through line 96 and are preferably treated to separate $C_3$ and $C_4$ hydrocarbons which are recycled through the heating zone 74. One method of doing this is to pass the vapors through line 96 and mix them with the light vapors leaving the second fractionating tower 56 through line 60 and then further treating the mixture of relatively light vapors by compression and cooling to separate liquefied normally gaseous hydrocarbons as above described. However, the vapors passing through line 96 can be separately treated if desired, to separate $C_3$ and $C_4$ hydrocarbons which can be recycled to the heating zone 74 along with the $C_3$ and $C_4$ hydrocarbons separated in separator 66 and withdrawn therefrom through line 70.

Fractionating towers 28 and 56 may be replaced by a single fractionating tower provided with a trap out tray or trays to separate a desired hydrocarbon fraction within the boiling range from a higher boiling hydrocarbon fraction.

While I have shown one form of apparatus and have given an example with specific operating conditions in connection therewith, it is to be expressly understood that I am not to be restricted thereto as other apparatus or other arrangements and operating conditions may be used, and different operating conditions may be used with different charging stocks without departing from the spirit of my invention.

I claim:

The process for converting to gasoline motor fuel of high anti-knock value a highly paraffinic heavy naphtha of low anti-knock value consisting predominantly of hydrocarbons having at least six carbon atoms per molecule and including a substantial proportion of paraffins boiling above the gasoline boiling range, which comprises contacting said heavy naphtha with a dehydrogenating catalyst at elevated temperature for a time sufficient to effect substantial conversion of said paraffins including said high-boiling constituents to aromatic hydrocarbons including those boiling above the gasoline boiling range by dehydrogenation and cyclization reactions, fractionating the products to separate a heavy fraction boiling above the gasoline boiling range and consisting essentially of aromatic hydrocarbons, separately heating said heavy fraction under a superatmospheric pressure in excess of 200 pounds per square inch in the absence of any substantial proportion of added non-aromatic hydrocarbons to effect cracking of said high-boiling aromatic hydrocarbons in the side chains thereof and conversion of said high-boiling aromatic hydrocarbons to lower-boiling aromatic hydrocarbons boiling within the gasoline boiling range, and fractionating products of said cracking treatment and the products of said dehydrogenation treatment in a common zone to separate therefrom a gasoline fraction and a heavy fraction to be subjected to the cracking treatment.

HAROLD V. ATWELL.